SURGE PROTECTION CIRCUIT

Filed Jan. 15, 1962

INVENTOR.
WALTER BARNEY
BY Elliott & Pastoriza
ATTORNEYS 3,112,435
SURGE PROTECTION CIRCUIT
Walter Barney, 14221 Magnolia Blvd., Van Nuys, Calif.
Filed Jan. 15, 1962, Ser. No. 166,233
6 Claims. (Cl. 323—9)

This invention relates to electrical circuits and more particularly to an improved circuit for protecting a load from an initial high surge of electrical current when an electrical source is initially connected to the load.

This application constitutes a continuation-in-part of my co-pending application Serial No. 449,413, now Patent No. 3,017,564, filed August 12, 1954, and entitled "Protective Circuit."

In my foregoing mentioned co-pending application, there is described a protective circuit which includes an electrical element having a resistance which gradually decreases in response to current passing therethrough. This resistance is adapted to be connected in series between an electrical source and a load so that it will initially receive all current applied to the load. Also provided is a conductive circuit adapted to shunt the resistance. Cooperating with the conductive circuit in turn is a current responsive means in the form of a relay coil or equivalent structure connected also in series with the resistance element and load so as to receive all current passing through the resistance element and load. When this current attains a pre-determined value, it will actuate the relay to close the conductive circuit about the resistance element shunting the same out of the circuit so that the electrical source is connected directly to the load.

The resistance element may comprise a "thermister" which has a negative temperature co-efficient of resistance so that initial current passing through the same will gradually heat the element and thereby gradually decrease its resistance. The element thus presents a high resistance to the electrical current initially supplied to the load and as the element becomes heated, its resistance gradually decreases so that the current to the load is gradually increased until a point is reached at which the current is of sufficient value to operate the relay and shunt the resistance element out of the circuit. With the resistance element shunted out of the circuit, it will cool and thereby its resistance will increase to its normal high value. At any point that the electrical source is disconnected from the load, the conductive circuit will open because of de-energization of the relay coil and thus the resistance element will be placed in series with the load so that upon reconnection of the electrical source to the load an initial high resistance is presented and thus the load is protected against high initial current surges.

The foregoing protective circuit operates successfully for television sets and other equivalent electrical loads which are normally turned on and a given period required before the device is warmed up. In such instances, the shunted out resistance element has adequate time to cool and thus when the television set or other load is disconnected and then reconnected, it is adequately protected against initial high surges. In some applications, however, there are instances in which the electrical source is connected to the load and then disconnected and reconnected at a relatively frequent interval. In such instances, the resistance element may not have an adequate chance to cool so that it will not immediately present a high resistance when a disconnection and reconnection is effected a short time after the conductive circuit has been connected to shunt out the resistance element. One such example is that of a press motor wherein initial starting of the motor is accomplished in a conventional manner, but because of incorrect alignment of the papers to be printed, the press must be turned off, the paper reset, and then the press immediately turned on again. In such cases, the resistance element may not have had a sufficient chance to cool and thus, if still in a heated state, its resistance will be low and a high initial surge may be applied to the press motor.

With the foregoing in mind, it is a primary object of this invention to provide an improvement over the protective circuit described and claimed in my co-pending application.

More particularly, it is an object of this invention to provide an improved protective circuit in which an initial high resistance is provided in series between an electrical source and load at any given time that the electrical source and load may be disconnected and reconnected even though such disconnection and reconnection may occur immediately after the conductive shunting circuit has been connected.

Briefly, these and other objects and advantages of this invention are achieved by substituting for the resistance element used in the circuit of my co-pending application a resistance means comprising at least two resistance elements, each of which has the characteristic of gradually decreasing resistance with increasing temperature. Cooperating with the two resistance elements is a switch means for alternately connecting the elements in series between the electrical source and the load. This alternate connection is effected each time the electrical source and the load are disconnected and then reconnected. Accordingly, there is always presented a low temperature element of high value resistance when the electrical source is initially connected to the load, one of the resistance elements always being out of the circuit so that it has an adequate length of time to cool.

In accord with a modified embodiment of the invention, a plurality of separate resistance elements may be sequentially connected into the circuit in response to each disconnection and reconnection of the circuit so that there is assured adequate time for cooling should there be a succession of disconnections and reconnections of the source and load.

A better understanding of the invention will be had by referring to the preferred embodiments thereof as illustrated in the accompanying drawings, in which.

Figure 1:
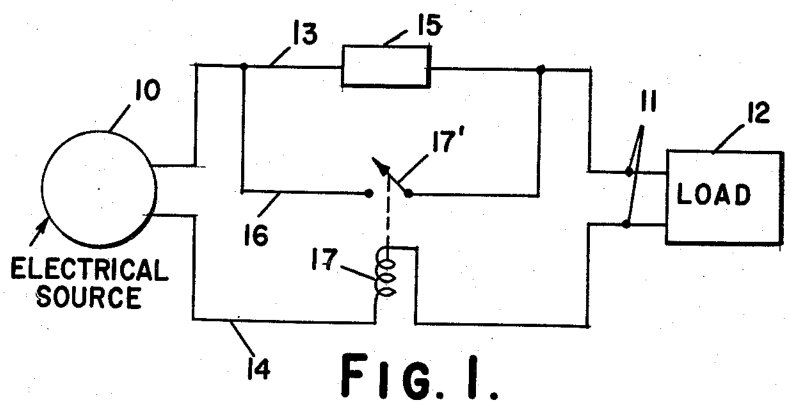
FIGURE 1 is a simple schematic circuit diagram illustrating the protective circuit as described and claimed in my above referred to co-pending application.

Referring first to FIGURE 1, there is illustrated a source of electrical energy 10 adapted to be connected to the terminals 11 of a load 12. To protect the load 12 from initial high current surges from the electrical source 10, there is incorporated a protective circuit including power lines 13 and 14. In the line 13, there is provided in series a resistance element 15 having a negative temperature co-efficient of resistance. Such an element may constitute a "thermister." Arranged to shunt the resistance element 15 is a conductive circuit 16. Circuit 16 as shown includes a relay switch arm 17′ arranged to be operated by a relay coil 17 connected in series with the resistance element 15 and load 12 through the power lead 14.

In the operation of the circuit of FIGURE 1, when the electric source 10 is initially connected to the terminals 11 of the load 12, all of the current from the electrical source passes through the resistance element 15 to the load 12 since the switch 17′ is normally open. The resistance element will present a relatively high resistance so that the initial current supplied to the load 12 will be relatively low. As current continues to pass through the resistance element 15, it will heat and as a consequence, its resistance will gradually decrease so that the current passing therethrough will gradually increase. This same changing current passes through the relay coil 17 and when a predetermined current value is reached, the relay coil 17 will be actuated to close the relay switch arm 17′ and connect the conductive circuit 16 across the resistance element 15, thereby shunting the resistance element 15 out of the circuit. Energy from the electrical source 10 will then pass through the conductive circuit 16 directly to the load 12 and back through the return circuit 14.

If the electrical source becomes disconnected from the load 12, the relay coil 17 will be de-energized resulting in the switch arm 17′ opening and thereby placing the resistance element 15 again in series between the electrical source and load. During the period that the electrical source was operating the load when the conductive circuit was closed, the resistance element 15 normally has sufficient time to cool so that it will present a relatively high resistance upon a subsequent reconnection of the electrical source to the load.

In some instances, however, the electrical source may be disconnected from the load 12 immediately after the conductive circuit 16 has shunted out the resistance element 15. If the electrical source is so disconnected, the relay 17 will be de-energized opening the switch 17′ and placing the resistance element 15 in series between the electrical source and load. If the electrical source is then immediately reconnected to the load, all current will pass through the resistance element 15 and since this resistance element is still heated or has not had sufficient time to cool, a high surge will be presented to the load 12.

Figure 2:
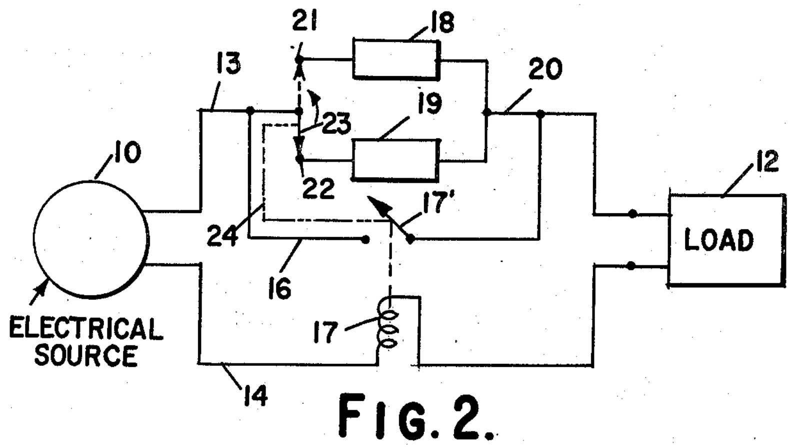
FIGURE 2 is a circuit diagram illustrating one embodiment of the improved protective circuit of the instant invention; and, FIGURE 3 is a circuit diagram of a modified embodiment of the protective circuit of this invention.

Referring now to FIGURE 2, there is shown the improved protective circuit of this invention in which the foregoing possibility is avoided. As shown, the circuit includes most of the components described in conjunction with FIGURE 1, the only difference being that first and second resistance elements 18 and 19 are substituted for the resistance element 15. As shown, like ends of elements 18 and 19 connect to the load through lead 20. The other ends terminate in switch terminals 21 and 22. A two-position, alternately operable switch 23 is provided and arranged to alternately connect to the terminals 21 and 22. This switch is ganged for operation as indicated by the dashed line 24 to the relay switch arm 17′. The movement of switch arm 17 to open position serves to actuate the switch arm 23 which functions in the manner of an impulse ratchet relay type single pole double throw switch. Thus physical movement of the switching arm 17′ upwardly steps the switch arm 23 from the terminal it is in contact with to the alternate terminal. The next upward physical movement of the arm 17′ will then switch the arm 23 back to its original terminal.

In the operation of the circuit of FIGURE 2, assume that the switch means 23 is in its solid line position so that the resistance element 19 is connected in series between the electrical source 10 and load 12. When the electrical source is initially connected to the load, all current supplied to the load will pass through the resistance element 19, resulting in a gradual heating thereof and thus a gradual increase of the current to the load. When this current reaches a pre-determined value, the relay coil 17 will operate to close the switch arm 17′ and thus shunt out the resistance element 19 through the conductive circuit 16 the same as described in conjunction with FIGURE 1.

If now the electrical source should be disconnected from the load and then immediately reconnected, such disconnection and reconnection will result in operation of the switch arm 17′ from its closed to open position and back to its closed position. This movement through the ganging 24 will rotate the switch arm 23 from the terminal 22 to the terminal 21. Thus, upon reconnection of the electrical source to the load, the resistance element 18 will now be placed in series, and since this resistance element is cool, it will protect the load 12 from the initial high surge of current. As the current through the resistance element 18 gradually increases, the relay coil 17 will again actuate the relay switch 17′ to shunt out the resistance element 18.

If now the electrical source should again be disconnected from the load 12 and reconnected, the resultant movement of the switch arm 17′ will again cause the switch arm 23 to rotate from the dotted line position to the solid line position to place the now cooled off resistance element 19 in series between the electrical source and load preparatory to protecting the load against an initial high surge of current.

From the foregoing description, it will be clear that more than two resistance elements could be incorporated in the event several disconnections and reconnections between the electrical source and the load were to take place as might be required in the case of adjusting a press motor. In such an instance, any desired number of resistance elements may be arranged to be sequentially connected in series between the electrical source and load in response to each disconnection and reconnection of the electrical source to the load.

Figure 3:
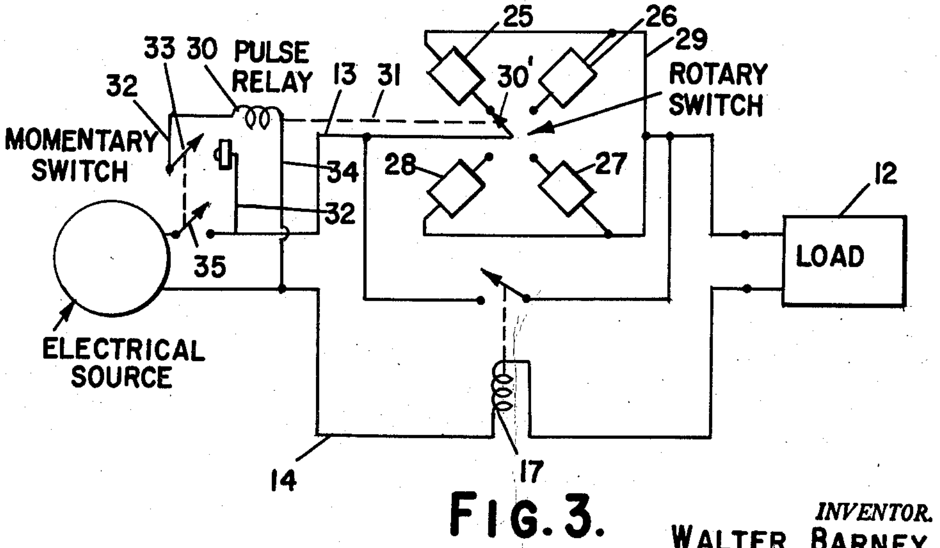

Thus, in FIGURE 3, there are shown several such resistance elements as indicated at 25, 26, 27, and 28 commonly connected at outer ends through lead 29 to load 12 and having inner ends arranged to be sequentially connected to a rotary switch arm 30′. Switch arm 30′ connects to power lead 13 and is operated by a pulse relay 30 as indicated by the dashed line 31. Every time a pulse of energy is applied to the pulse relay, the arm 30′ is caused to step to the next successive contact in the manner of a stepper motor rotating a shaft through a discrete angle in response to each pulse of energy received. As shown, the pulse relay 30 is connected across the power leads 13 and 14 by a conductor 32, including a momentary switch 33 in series therewith, and a return conductor 34. The momentary switch 33 is ganged for simultaneous operation with an on-off switch 35 for connecting and disconnecting the electrical source to the load. The remaining components in the circuit of FIGURE 3 are identical to those described in conjunction with FIGURE 1.

In the operation of the circuit of FIGURE 3, when the switch 35 is closed to connect the electrical source to the load, the momentary switch arm 33 will be actuated to momentarily connect the pulse relay 30 across the power line and thereby cause a stepping of the switch arm 30′ to one of the sequentially positioned resistance elements. Assume that the switch arm was formerly connected to the element 28 and is now moved to the element 25 as shown in solid lines. Initial current from the electrical source to the load 12 will then pass through the lead 13, resistance element 25, and common line 29 to the load 12. Because of the high initial resistance, this current will be small but will gradually increase as the resistance element 25 heats. When the current attains a pre-determined value, the relay coil 17 will close the conductive circuit to shunt out the resistance element 25 so that the electrical source will be connected directly to the load 12.

If the electrical source is now disconnected and immediately reconnected to the load as by rapid opening and closing of the on-off switch 35, the corresponding operation of switch arm 33 will step the rotary switch 30′ to the resistance element 36, thereby connecting that element in series between the electrical source and load. Since this element was previously out of the circuit, it is at a low temperature so that its resistance to initial current passing therethrough is high.

A similar sequence of events will occur each time the on-off switch 35 is opened and closed so that the resistance elements are successively switched into series connection between the electrical source and load and thus the load will at all times be protected against high initial current surges.

From the foregoing description, it will be evident that the present invention has provided an improved protective circuit in which a load is protected under all circumstances of operation, including those in which the electrical source and load may be disconnected and then immediately reconnected at a time shortly before or after the initial resistance element has been heated to present a low resistance.

Minor modifications falling clearly within the scope and spirit of this invention will occur to those skilled in the art. The improved protective circuit is therefore not to be thought of as limited to the exact embodiments disclosed merely for illustrative purposes.

What is claimed is:

1. A protective circuit for connection between an electrical source and a load, comprising, in combination:
   (*a*) a current sensitive resistance means which gradually decreases in resistance from a given high value in response to current passing therethrough, said resistance means being adapted for connection in series with said load such that all current initially supplied to said load passes through said resistance means, whereby said current gradually increases;
   (*b*) a conductive circuit adapted to shunt said resistance means; and,
   (*c*) current responsive means connected in series with said load and said resistance means and responsive to a given value of said current passing through said resistance means for closing said conductive circuit a given length of time after application of said load, said resistance means including means responsive to disconnection and reconnection of said electrical source and said load for providing substantially immediately a resistance of said given high value to current supplied to said load upon reconnection of said electrical source to said load.

2. A circuit according to claim 1, in which said resistance means includes at least two resistance elements, and said means responsive to disconnection and reconnection of said electrical source and load comprises a switch for alternately connecting said resistance elements in series with said load upon the occurrence of each disconnection and reconnection whereby that resistance element not immediately previously subject to initial current applied to said load receives initial current applied to said load after a disconnection and reconnection of said source to said load.

3. A circuit according to claim 2, in which said switch is responsive to opening of said conductive circuit as a consequence of disconnection of said electrical source from said load.

4. A circuit according to claim 2, in which said switch is a rotary switch for successively connecting said resistance elements in series with said load, said rotary switch being responsive to reconnection of said source to said load.

5. A protective circuit for connection between an electrical source and load, comprising, in combination:
   (*a*) at least two resistance elements each having a resistance which gradually decreases in value from a given high value in response to current passing therethrough;
   (*b*) switch means for alternately connecting said resistance elements in series with said load upon each actuation such that all current initially supplied to said load at a given time passes through the one resistance element connected in series with said load at said time;
   (*c*) a conductive circuit adapted to shunt said one resistance element; and,
   (*d*) current responsive means connected in series with said load and said one resistance element and responsive to a given value of said current passing through said one resistance element for closing said conductive circuit a given length of time after application of said load, said switch means being actuated to substitute the other of said resistance elements for said one resistance element in response to a disconnection and reconnection of said source to said load.

6. A circuit according to claim 5, in which said current responsive means includes a relay coil connected in series with said one resistance element and said load, and in which said conductive circuit includes a relay switch adapted to be closed by said relay coil when current passing through said relay coil attains said given value and to open when said source is disconnected from said load to de-energize said relay coil, said switch means being coupled to said relay switch for actuation when said relay switch is open.

References Cited in the file of this patent

UNITED STATES PATENTS 2,885,604 Stavrinaki ______________ May 5, 1959